US011151285B2

(12) United States Patent
Malecki et al.

(10) Patent No.: US 11,151,285 B2
(45) Date of Patent: Oct. 19, 2021

(54) DETECTING SENSITIVE DATA EXPOSURE VIA LOGGING

(71) Applicant: International Business Machines Corporation, Armonk, NY (US)

(72) Inventors: Bartlomiej Tomasz Malecki, Slomniki (PL); Maria Hanna Oleszkiewicz, Smardzowice (PL); Blazej Rafal Rutkowski, Cracow (PL); Daniel Jakub Ryszka, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/293,777

(22) Filed: Mar. 6, 2019

(65) Prior Publication Data

US 2020/0285772 A1 Sep. 10, 2020

(51) Int. Cl.
*G06F 21/62* (2013.01)
*G06F 21/60* (2013.01)
*G06F 9/54* (2006.01)
*G06F 16/17* (2019.01)

(52) U.S. Cl.
CPC .......... *G06F 21/6254* (2013.01); *G06F 9/542* (2013.01); *G06F 16/1734* (2019.01); *G06F 21/602* (2013.01)

(58) Field of Classification Search
CPC .... G06F 21/6254; G06F 21/602; G06F 9/542; G06F 16/1734; G06F 21/6245
USPC .......................................................... 726/26
See application file for complete search history.

(56) References Cited

U.S. PATENT DOCUMENTS

| 7,512,985 | B1* | 3/2009 | Grabarnik | G06F 21/6263 |
| | | | | 707/999.009 |
| 2005/0278270 | A1* | 12/2005 | Carr | G06Q 10/10 |
| | | | | 706/25 |
| 2017/0104756 | A1* | 4/2017 | Rosenthal | H04L 63/20 |
| 2017/0149793 | A1 | 5/2017 | Spertus et al. |

(Continued)

FOREIGN PATENT DOCUMENTS

CN 107506660 A 12/2017

OTHER PUBLICATIONS

Malecki et al., "Detecting Sensitive Data Exposure via Logging", U.S. Appl. No. 16/515,073, filed Jul. 18, 2019.

(Continued)

*Primary Examiner* — Dant B Shaifer Harriman
*Assistant Examiner* — Aubrey H Wyszynski
(74) *Attorney, Agent, or Firm* — Jeffrey M. Ingalls

(57) ABSTRACT

A method for controlling exposure of sensitive data though a logging system is provided. The method comprises: upon receiving a request by the request handler, determining sensitive data as part of the request by applying a rule, converting the data into a transformed format, and registering the data together with a related data field label with a log handler. Then, upon receiving by the log handler a log entry, converting each expression of the log entry into the transformed format, and comparing each transformed expression with each of the sensitive data in the transformed format. Upon determining a match of one of the transformed expressions with one of the sensitive data in the transformed format, the method comprises issuing an alert indicating that the log entry comprises sensitive data.

16 Claims, 6 Drawing Sheets

(56) References Cited

U.S. PATENT DOCUMENTS

2017/0206376 A1* 7/2017 Sher-Jan ............. H04L 63/1433
2018/0276401 A1* 9/2018 Allen .................. G06F 21/6245

OTHER PUBLICATIONS

List of IBM Patents or Patent Applications Treated as Related, Jul. 17, 2019, 2 pages.

Anonymous, "Method and Apparatus for log obfuscation to prevent sensitive info exposure", An IP.com Prior Art Database Technical Disclosure, IP.com No. IPCOM000217620D, IP.com Electronic Publication Date: May 9, 2012, 8 pages.

"Simplify GDPR Compliance Monitoring With a Complete Set of Essential Security Capabilities in a Single Solution", GDPR Compliance, © Copyright 2018 AlienVault, Inc., printed Nov. 8, 2018, 3 pages.

* cited by examiner

DETECTING SENSITIVE DATA EXPOSURE VIA LOGGING

BACKGROUND

The invention relates generally to controlling an exposure of sensitive data, and more specifically, to a computer-implemented method for controlling an exposure of sensitive data through a logging system.

Companies using enterprise applications are acquainted with logging systems. Such systems track changes to, e.g., transactional systems which typically only record the last status of transactions. This may be typical for ordering systems, banking systems (in which the current balance of an account is shown), logistics systems, and access systems (as part of security systems). However, to track the historical developments leading up to the latest status available in the transactional system, logging systems may track the sequence of events leading to the actual status of the transactional system, e.g., to its underlying database.

Logging may also be used by other systems, e.g., measurement of sensor data, access control systems (physical or logical), archiving systems, and any other system tracking status information which change over time. These logging systems may be able to reconstruct the status of the underlying (transactional) system at a certain point in time.

SUMMARY

According embodiments of the present invention, a method, computer program product, and system for controlling an exposure of sensitive data may be provided. The method may comprise providing a sensitive data rule accessible by a request handler. The sensitive data rule may define which type of data is sensitive. Upon receiving a request by the request handler, the method may be adapted to perform, by the request handler, determining sensitive data as part of the request by applying the sensitive data rule, converting the sensitive data into a transformed format, and registering the sensitive data in the transformed format together with a related data field label with a log handler.

Additionally, upon receiving, by the log handler, a log entry, the log handler may further convert each expression of the log entry into the transformed format, compare each transformed expression with each of the sensitive data in the transformed format being registered with the log handler; and, upon determining a match of one of the transformed expressions with one of the sensitive data in the transformed format, issue an alert indicating that the log entry comprises or relates to sensitive data. Thereby, the alert may comprise an alert label. Upon not determining the match, the method may comprise logging the log entry.

The above summary is not intended to describe each illustrated embodiment or every implementation of the present disclosure.

BRIEF DESCRIPTION OF THE DRAWINGS

It should be noted that embodiments of the invention are described with reference to different statutory classes. In particular, some embodiments are described with reference to method type claims, whereas other embodiments are described with reference to apparatus type claims. However, a person skilled in the art will gather from the above and the following description that, unless otherwise notified, in addition to any combination of features belonging to one statutory class, any combination between features relating to different statutory classes, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
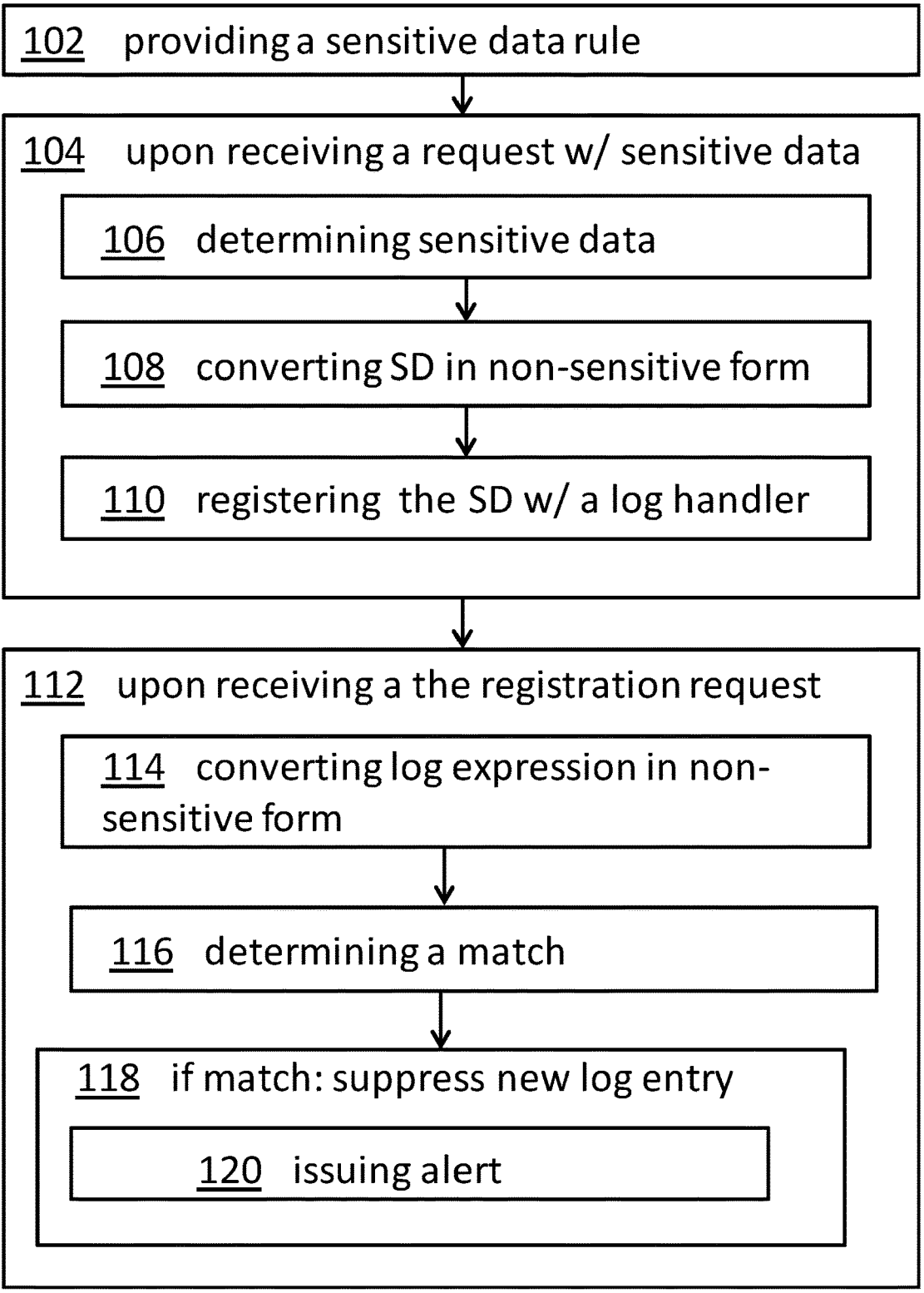

Preferred embodiments of the invention will be described, by way of example only, and with reference to the following drawings:

FIG. 1 shows a block diagram of an embodiment of a computer-implemented method for controlling an exposure of sensitive data through a logging system.

Figure 2:
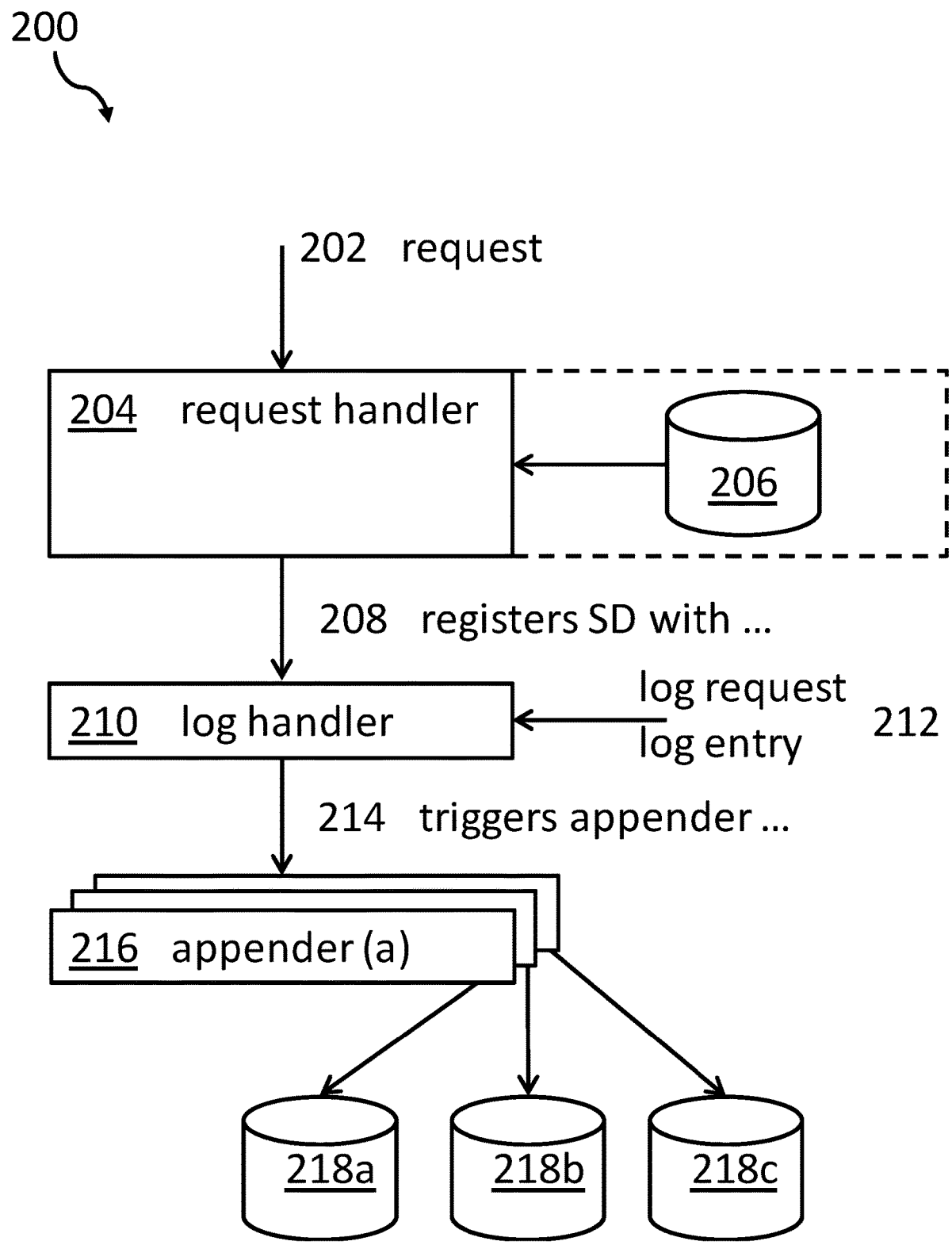

FIG. 2 shows a block diagram of an embodiment of involved micro-services.

Figure 3:
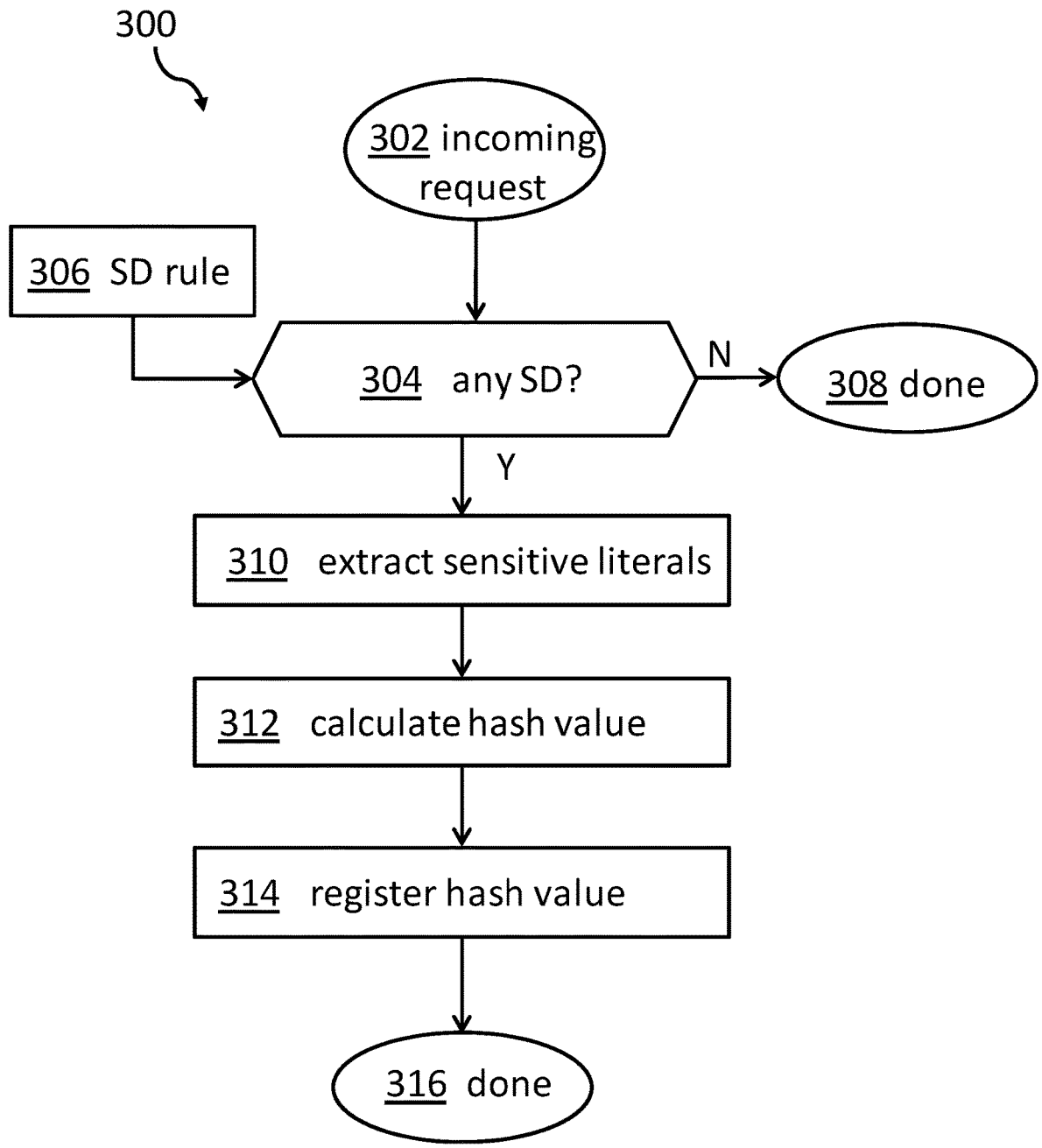

FIG. 3 shows a block diagram of an embodiment of a flowchart executable by the request handler.

Figure 4:
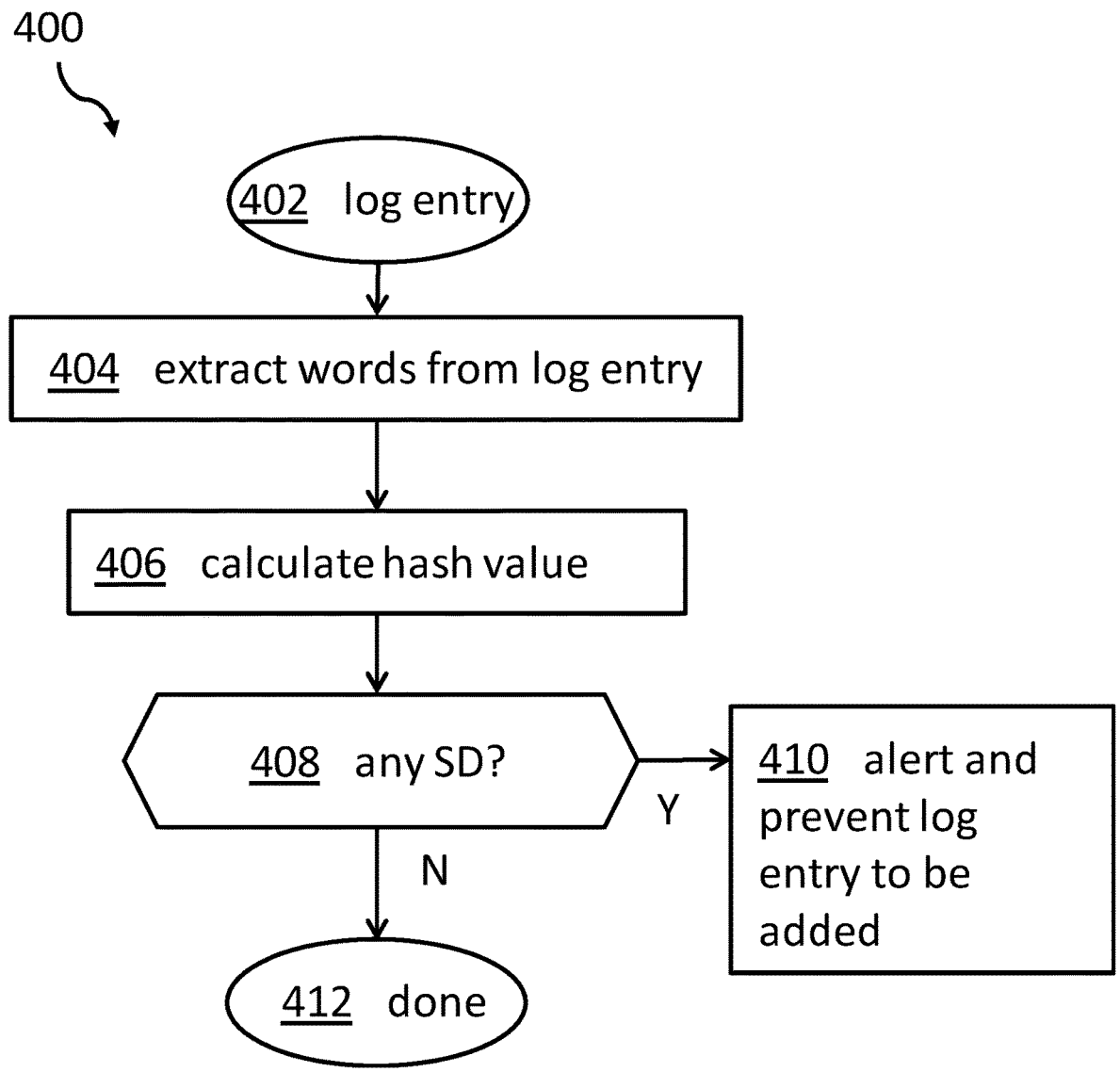

FIG. 4 shows a block diagram of an embodiment of a flowchart executable by the log handler.

Figure 5:
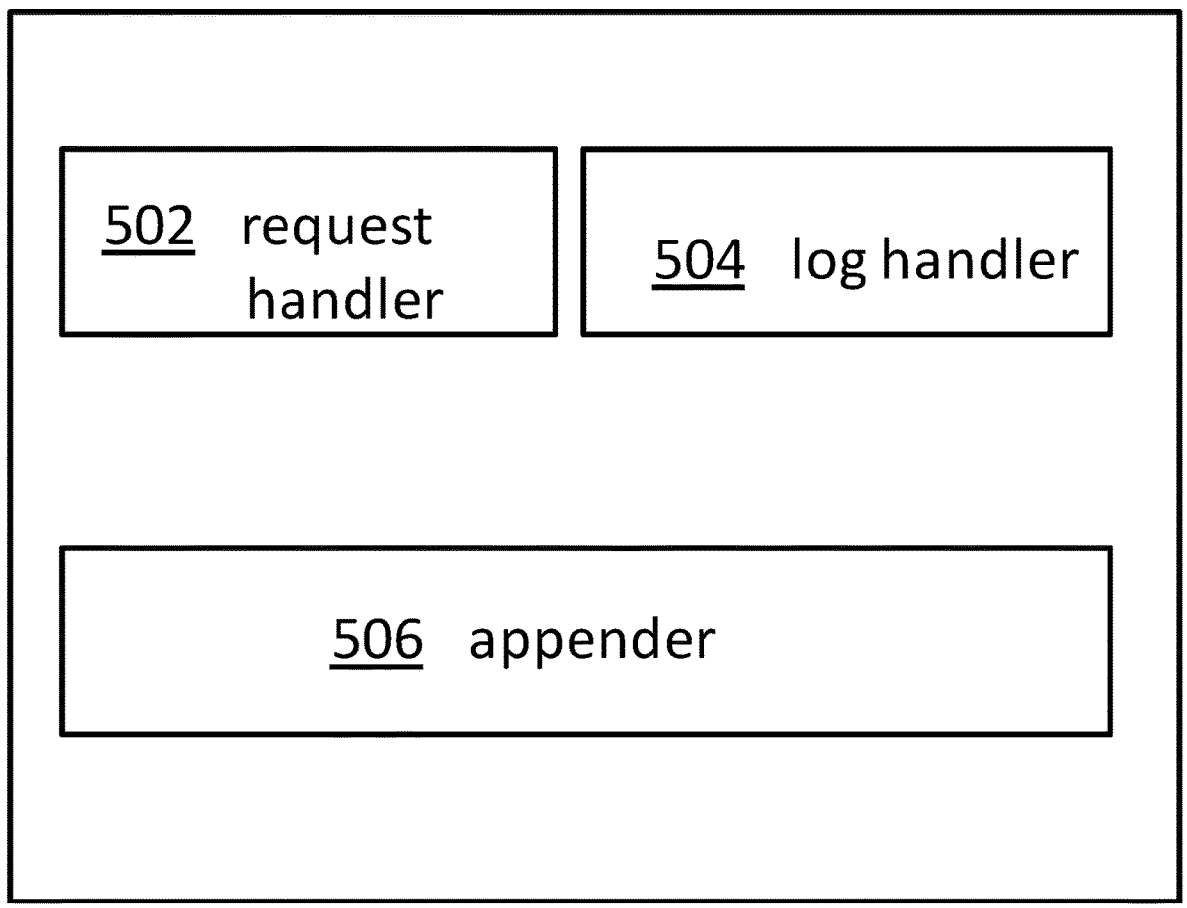

FIG. 5 shows a block diagram of an embodiment of the privacy system for controlling an exposure of sensitive data through a logging system.

Figure 6:
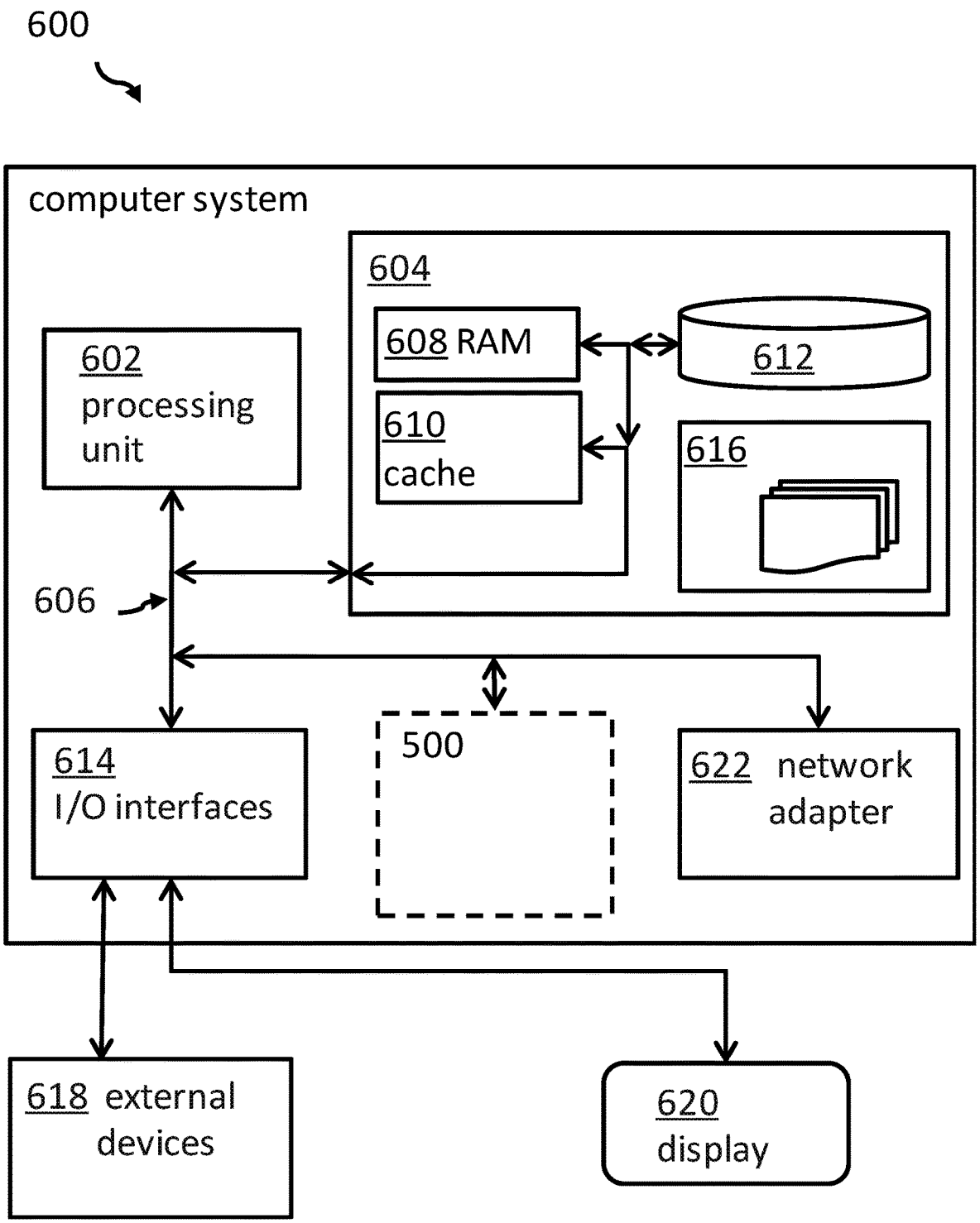

FIG. 6 shows a block diagram of an embodiment of a computing system comprising the privacy system according to FIG. 5.

DETAILED DESCRIPTION

In the context of this description, the following conventions, terms and/or expressions may be used:

The term 'sensitive data' may denote in the context of this document, those data relating to personal or private data, in particularly those data falling on a data protection regime, like GDPR. However, data may be defined as being sensitive by a dedicated sensitive data rule. The rule may be predefined and/or may be changed dynamically throughout the execution of the method. Typically, sensitive data may be protected from being exposed to unauthorized personnel (or systems), e.g., service personnel of a logging system.

The term 'logging system' may denote a system for storing, tracking, logging and/or reporting time-related nearly arbitrary numeric values, text expressions and/or large objects, like files or images. Logging systems have been used longer-term already; however, they have not been sensitive to privacy issues and un-allowed exposure of sensitive data to unauthorized personnel. A logging system may store changes to statuses of, e.g., transactional systems typically in one or more log files. The logging system may allow a later reconstruction of the sequence of actions performed.

The term 'sensitive data rule' may denote a predefined or dynamically changing rule defining which type of data may be sensitive in the sense of not being allowed to be exposed and/or disclosed to unauthorized personnel (or systems).

The term 'request handler' may denote a micro-service of a related system being adapted to receive requests to be performed. A request may be, e.g., an order to transfer money from one account to another, in order to access a certain system, or a commercial transaction being recorded in the transactional system. The request handler may perform specific tasks. It may be designed for, and in addition being adapted, identifying sensitive data as part of the received request.

The term 'request' may denote any received instruction or order concluding related data to, e.g., a request handler.

However, the term 'request' may also be used in a broader sense, namely as a message to perform a certain task by a certain service, e.g., a micro-service or a related system.

The term 'transformed format' may denote a format of data in which the data do not appear in a clear text, human readable format. Additionally, it should not be possible to deduce/compute the actual clear text (so not every kind of transformation may be applicable). One example of a transformed format may be a hash value of the related original data. Basically, any hash method or algorithm may be used. Another example of a generating a transformed format of data would be an application of an encryption method, e.g., symmetrical or asymmetrical.

The term 'data field label' may denote metadata describing a meaning of a certain data field, expression or word.

The term 'log handler' may denote a service or a related system. Adapted for receiving a log entry, e.g., in form of a log record typically comprising a sequence of expressions separated by delimiters. A typical delimiter may be a space character. A country may also have a specific format and may have a fixed length. Alternatively, the log record may have a variable length format.

The term 'log entry' may denote a record to be logged by a log handler.

The term 'alert' may denote a physical or logical alarm being issued if the log handler may detect sensitive data to be logged, e.g., in clearly readable text format.

The term 'hash value' may denote a result of a hashing algorithm applied to input data.

The term 'queuing' may denote collecting a series of input values into a queue to be serviced in a batch-like manner.

The term 'expression' may denote an isolated sequence of non-delimiter space characters, e.g., a word, even if the word includes numbers and other special characters. An expression may also be seen as a unit of a language comprising one or more spoken sounds or the written representation functioning as printable carrier or meaning. Words are composed of one or more morphemes and are either the smallest units susceptible of independent use or consist of two or three such units combined under certain linking conditions. In this sense, the expression '+48 234 123 876' may be interpreted as a single word or expression relating to a telephone number.

The term 'micro-service' may relate to a software development technique—a variant of the service-oriented architecture (SOA) architectural style that structures an application as a collection of loosely coupled services. In a micro-services architecture, services may be fine-grained, and the protocols may be light-weight. The benefit of decomposing an application into different smaller services is that it improves modularity and may make the application easier to understand, develop, and test and more resilient to architecture erosion. It may help to the parallelize software development by enabling small autonomous teams to develop, deploy and scale their respective services independently. It may also allow the architecture of an individual service to emerge through continuous refactoring Micro-services-based architectures enable continuous delivery and deployment.

The proposed computer-implemented method for controlling an exposure of sensitive data through a logging system may offer multiple advantages and technical effects:

Personal information may be stored as part of a log record in clear text format. Because the log records are typically stored in a clear text format, these log data may also be available to e.g., service personnel. This may be in conflict with data security regulations, e.g., GDPR (General Data Protection Regulations—the EU data protection regime). In principle, access to sensitive data should only be granted to authorized personnel in such a way that allows tracking the fact of data being accessed/for limited time and purpose.

Thus, under the new private data protection regulations, logging may be among the trickiest of security regulations. While data schemas, etc. are not particularly flexible, and it is easy to make sure that no sensitive data has been exposed during development/code review and the like, the logging process is very dynamic, and simple code reviews may not be sufficient to tell if a code change is safe from a GDPR point of view.

Log entries of logging systems may be made compliant to data protection and privacy rule regulations, like the EU's GDPR. Service personnel handling logging systems and related data, like log files or log databases, may no longer have access to sensitive data. In contrast to potentially existing systems, which may make sensitive data and log files illegible in clear text, the proposed concept ensures, advantageously, that no sensitive data are logged in clear text format at all. As a part of the logging process, it is ensured according to predefined rules—in particular to the one or more data sensitivity rules—that no sensitive data are logged in clear text format in any of the used log files (or log databases).

However, the proposed concept may also be implemented selectively to certain expressions and/or to certain types of log entries. Thus, a final system implementation may decide where sensitive data may be logged and where not.

Also, thanks to the labels provided by request handler—the source of the leak may be quickly and accurately identified.

In the following, additional embodiments of the proposed method—also applicable to the related system—are disclosed.

According to one advantageous embodiment of the method, the converting the sensitive data into a transformed format may include determining a hash value for the related data element, in particular an expression, e.g., a word representing the sensitive data. Although other masking technologies for hiding the clear text expression may be possible—like any other symmetrical or asymmetrical encryption—a generation of a hash value may be executed in a straightforward manner, and whereby different hash algorithms may be used. In comparison to other encryption methods, hashing does not require a lot of computing resources. Furthermore, additional scrambling technologies, making the sensitive data illegible or non-retrievable, may be used.

According to one preferred embodiment of the method, the determining a match may also comprise suppressing the logging of the log entry as received. Thus, the sensitive data comprised in the log record may not be logged as in a usual logging system. However, the sensitive data may only be logged in a hashed format.

According to one permissive embodiment of the method, the sensitive data rule may be received from a source external to the request handler or the sensitive data rule may be stored within a storage of the request handler. Thus, the implementation freedom is not limited to any particular location for the storage of the sensitive data rule(s).

According to one optional embodiment, the method may also include controlling a lifetime of the sensitive data in the transformed format registered with the log handler. This may be instrumental for a lean implementation of the log handler. No storage capacity and/or no memory resources may be blocked unnecessarily.

According to an advanced embodiment of the method, controlling the lifetime of sensitive data may include lean implementation management policies, which may include one or more of (a) removing an entry comprising the sensitive data in the transformed format from the log handler after a service requesting the registration has been completed, (b) removing the entry comprising the sensitive data in the transformed format from the log handler after a predefined expiration time, and (c) not removing the entry comprising the sensitive data in the transformed format in the log file at all. Also, a mixture of the different options may be possible during different time periods or according to other predefined or dynamically applied rules. This may also contribute to a lean implementation of the log handler.

According to another optional embodiment, the method may also comprise queuing the received requests, by the request handler, before registering sensitive data with the log handler. Hence, the hashing may be performed for a group of sensitive data, which may also increase the performance of the underlying system. In embodiments, the hashing may be performed on the groups in parallel, for example, using Single Instruction Multiple Data (SIMD) techniques.

According to a further optional embodiment of the method, the queuing may be performed according to a predefined rule. This feature may be used to avoid log handler registering in system peak hours, if the system workload lies above a threshold value, etc. Hence, it may be ensured that the proposed method may not lead to system performance degradation.

According to one allowable embodiment of the method, the request handler, the log handler and another service from which the request handler received the request may be each implemented as a micro-service. Thus, the proposed concept may be integrated into traditional programming and computing approaches as well as into micro-services environment comprising a set of request handlers in a server-based or server-less (cloud) computing environment. Also, the appenders may be implemented as one or more micro-services.

According to one further embodiment of the method, the converting each expression of the log entry into the transformed format may also include filtering out a common expression known to be not sensitive using a dictionary and/or repository. Such common expressions may, e.g., comprise words "the", "and", "an", and the like in order to improve the system performance. Any fill word not being relevant—according to predefined rules—for a reconstruction of a previous status of a related transactional system (or similar) may be eliminated from the logged entry or log record.

In the following, a detailed description of the figures will be given. All instructions in the figures are schematic. Firstly, a block diagram of an embodiment of the inventive computer-implemented method for controlling an exposure of sensitive data through a logging system is given. Afterwards, further embodiments, as well as embodiments of the privacy system for controlling an exposure of sensitive data through a logging system, will be described.

FIG. 1 shows a block diagram of an embodiment of the computer-implemented method 100 for controlling an exposure of sensitive data through a logging system, e.g., a protection against making access to sensitive data possible by unauthorized, e.g., service personnel. The method 100 comprises providing, 102, a sensitive data rule accessible by a request handler. In a typical system for implementing the proposed method, more than one sensitive data rule can be made available, e.g., can be received via request or stored internally in the request handler. There may be at least one sensitive data rule for each type of request and/or each type of sensitive data.

The method 100 further comprises: in response to receiving the request at 104, determining, at 106, the sensitive data within the request, according to the sensitive data rule; converting, at 108, the sensitive data (SD) into a non-sensitive format (e.g., converting each expression/word separately into a format which may create a hash value); and registering, at 110, the SD in the transformed format together with a related data field label (e.g., a request identifier field name) at the log handler. This may ensure that the log handler "knows" (has information about) which data is sensitive.

The method 100 may further comprise executing a set of operations upon receiving by the log entry registration request by the log handler at 112 (e.g., operations 114, 116, 118, and 120). It may also be mentioned that the log handler may receive the log entry from a source other than the request handler, for example, in the form of a set of separated expressions. The mentioned set of operations of the log handler may comprise: converting, at 114, each expression (e.g., each word) of the log entry into the transformed format (e.g., generating a hash value and comparing each transformed expression with each of the sensitive data in the transformed format being registered with the log handler); and upon determining, at 116, a match of one of the transformed expressions with one of the sensitive data in the transformed format, issuing, at 120, an alert indicating that the log entry relates to the comprised sensitive data. The alert may also include an indication about the type of alert (alert label).

If no match is determined at 116, the log entry is logged. If, however, a match is determined at 116, a new log entry therefor is suppressed at 118, and an alert is issued at 120 to indicate that the suppressed log entry includes sensitive data. This may be performed by one or more appenders—which may also be implemented as a micro-service—wherein a selection of the appender from a group of appenders may be based on the type of log record. Predefined rules may be used to select an appropriate appender. Alternatively, the log handler may by itself perform the logging action.

FIG. 2 shows a block diagram 200 of an embodiment of involved micro-services. The request 202 is received by the request handler 204. The request handler 204 has access to at least one data sensitivity rule. It may be stored in a specific repository 206 or directly as part of the request handler 204. The second micro-service involved in the proposed concept is the log handler 210. With this log handler 210, the request handler 204 registers sensitive data 208 in a hash format.

Independently of the request handler 204, the log handler 210 may receive a block request comprising a log entry 212. The log handler 210, then converts each expression or word of the received log entry 212 into a hash format using the same hashing algorithm as the request handler and performs comparisons between the registered sensitive data in the hashed format. When a match is found, the related log entry may be suppressed or, alternatively, only logged (e.g., by triggering appender(s), 214) with information about the sensitive data (e.g., metadata) or with the sensitive data in the transformed format (e.g., hashed). The actual logging may typically be performed by one or more specific appenders 216 (e.g., appender (a); potential additional appenders only shown symbolically as additional rectangles). Each appender—also implemented as, e.g., a micro-service—may be designed for logging predefined types of log entries in different log files, e.g., log files 218*a*, 218*b*, 218*c* (or any other number of log files).

FIG. 3 shows a block diagram of an embodiment of a flowchart 300 executable by the request handler. The incoming request 302 is checked (e.g., analyzed), at 304, for sensitive data. The related sensitive data rule may be received from a specific storage location (e.g., a sensitive data rule repository 306). Alternatively, the rules may be implemented as part of (e.g., internally by) the request handler.

If no sensitive data are present in the incoming request 302, the process stops at 308.

If sensitive data are present in the incoming request 302, the request handler extracts, at 310, the sensitive literals (e.g., sensitive expressions or words). At 312, a hash value of each of the sensitive expressions is calculated. Further, at 314, the hash value(s) is/are registered with the log handler (not shown). After that, the process ends at 316.

FIG. 4 shows a block diagram of an embodiment of a flowchart 400 executable by the log handler. Once a log entry 402 is received, the method comprises extracting, at 404, expressions, literals, or words from the received log entry 402. Then, for each of these extracted expressions, literals, or words, a hash value is calculated at 406. In order to determine whether sensitive data are present in the received log entry 402, each of the calculated hash values is compared to those hash values being registered by the request handler (not shown) indicating sensitive expressions or data (e.g., the hash values registered at 314 of FIG. 3). If in this way any sensitive data has been determined at 408, an alert is triggered at 410, and the log entry is prevented from being added to the log file in its entirely; rather, only the portions with sensitive data in a non-clear text format may be added. If no sensitive data are detected at 408, the process of the method ends at 412.

An example may render the proposed general concept more understandable: the request handler may receive a request comprising data in the following record:

Name: Adam; surname: Smith; IBAN: DE8937040044404053201 3000; telephone: +49 123 345 678; amount: 350; comment: _____.

Depending on the context of the request, this record or log entry may comprise personal or sensitive data which should not be disclosed to non-authorized personnel. The term 'IBAN' may indicate an international banking number. Thus, the log entry comprises a name, a related bank account number and a related telephone number and a related bank account balance as sensitive data.

The request handler may, e.g., extract the IBAN, DE8937040044040532013000, as sensitive data based on the sensitive data rule which may indicate that a number of the IBAN field is sensitive data.

The request handler may then generate a hash value, e.g., 'G6T77Zr' from the IBAN number and relate the label 'IBAN' to it as an indication what the hash value relates to. This hash value is then registered by the request handler with the log handler. From now on, the log handler "knows" that a received log entry comprising—in the hashed format—the value 'G6T77Zr' comprises sensitive data, even if these are not directly determinable as clear text sensitive data.

If the log handler now receives the log entry, the log handler will generate a hash value for each expression/word in the log entry record. Let's assume that the log entry looks like this: "validation of DE8937040044040532013000 has failed".

Then, the log handler will create for each word of the received log entry, a hash value: "validation" → 34562, "of" → 56, or this turn may be skipped because it may be determined as fill word, "DE8937040044040532013000" → G6T77Zr, "has" → 56712, or this turn may be skipped because it may be determined as fill word, "failed" → 13134.

The hash value G6T77Zr has been registered before as sensitive data with the associated label 'IBAN'. Hence, according to the method, an alert is triggered that sensitive data with the label 'IBAN' may be logged in clear text form in the log record and thus may be leaking out of the system, e.g., with the risks to be exposed to unauthorized personnel because it may be logged in the log file as log entry into text form. Thus, the proposed system has now identified sensitive data, which should not be logged in clear text form in any log record.

FIG. 5 shows a block diagram of the privacy system 500 for controlling an exposure of sensitive data through a logging system. The privacy system 500 comprises a sensitive data rule repository 502 adapted for providing a sensitive data rule accessible by a request handler 504. The sensitive data rule defines which type of data is sensitive.

The request handler 502 is adapted for: upon receiving a request, performing determining sensitive data as part of the request by applying the sensitive data rule, converting the sensitive data into a transformed format, and registering the sensitive data in the transformed format together with a related data field label with a log handler.

The log handler 504 is adapted for: upon receiving a log entry at the log handler, converting each expression of the log entry into a transformed format; and comparing each transformed expression with each of the sensitive data registered with the log handler 504. Upon determining a match, issuing an alert indicating that the log entry comprises sensitive data. The alert comprises also an alert label for easy identification by a human operator. If no matches are determined, the log entry can be logged without problems by, e.g., a dedicated log appender 506.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the privacy system 500 for controlling an exposure of sensitive data through a logging system may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A system for controlling an exposure of sensitive data, the system comprising:

a memory with program instructions stored thereon; and a processor in communication with the memory, wherein the program instructions cause the system to:

provide a sensitive data rule accessible by a request handler;

in response to receiving a request by the request handler, determine sensitive data within the request by applying the sensitive data rule;

convert the sensitive data into a set of transformed sensitive data;

register the set of transformed sensitive data with one or more related data field labels at a log handler;

receive, at the log handler, a log entry related to the request;

convert each expression of the log entry into a set of transformed expressions;

compare the set of transformed expressions with the set of transformed sensitive data registered at the log handler;

in response to the comparing, determine a match of at least one of the set of transformed expressions with one or more of the set of transformed sensitive data; and issue an alert that the log entry includes sensitive data.

2. The system of claim 1, wherein converting the sensitive data into a set of transformed sensitive data includes generating a hash value for the related data element.

3. The system of claim 1, wherein determining a match further comprises preventing the logging of the log entry, as received.

4. The system of claim 1, wherein the sensitive data rule is received from a source external to the request handler and the sensitive data rule is stored within a local storage of the request handler.

5. The system of claim 1, wherein the set of transformed sensitive data includes a lifetime of sensitive data registered at the log handler.

6. The system of claim 5, wherein the lifetime of sensitive data is controlled according to a set of lean implementation management policies.

7. The system of claim 1, wherein the program instructions further cause the system to queue a set of received requests, by the request handler, before registering the set of transformed sensitive data with the log handler.

8. The system of claim 7, wherein the queuing is performed according to a predefined rule.

9. A computer program product for controlling an exposure of sensitive data, the computer program product comprising a computer readable storage medium having program instructions embodied therewith, the program instructions executable by a device to cause the device to:

provide a sensitive data rule accessible by a request handler;

in response to receiving a request by the request handler, determine sensitive data within the request by applying the sensitive data rule;

convert the sensitive data into a set of transformed sensitive data;

register the set of transformed sensitive data with one or more related data field labels at a log handler;

receive, at the log handler, a log entry related to the request;

convert each expression of the log entry into a set of transformed expressions;

compare the set of transformed expressions with the set of transformed sensitive data registered at the log handler;

in response to the comparing, determine a match of at least one of the set of transformed expressions with one or more of the set of transformed sensitive data; and issue an alert that the log entry includes sensitive data.

10. The computer program product of claim 9, wherein converting the sensitive data into a set of transformed sensitive data includes generating a hash value for the related data element.

11. The computer program product of claim 9, wherein determining a match further comprises preventing the logging of the log entry, as received.

12. The computer program product of claim 9, wherein the sensitive data rule is received from a source external to the request handler and the sensitive data rule is stored within a local storage of the request handler.

13. The computer program product of claim 9, wherein the set of transformed sensitive data includes a lifetime of sensitive data registered at the log handler.

14. The computer program product of claim 13, wherein the lifetime of sensitive data is controlled according to a set of lean implementation management policies.

15. The computer program product of claim 9, wherein the program instructions further cause the system to queue a set of received requests, by the request handler, before registering the set of transformed sensitive data with the log handler.

16. The computer program product of claim 15, wherein the queuing is performed according to a predefined rule.

* * * * *